United States Patent [19]

Aubrun et al.

[11] Patent Number: 5,245,830
[45] Date of Patent: Sep. 21, 1993

[54] ADAPTIVE ERROR CORRECTION CONTROL SYSTEM FOR OPTIMIZING STIRLING REFRIGERATOR OPERATION

[75] Inventors: Jean-Noel Aubrun, Mountain View; Kenneth R. Lorell, Los Altos; Paul J. Reshatoff, Menlo Park; Robert R. Clappier, Los Altos, all of Calif.

[73] Assignee: Lockheed Missiles & Space Company, Inc., Sunnyvale, Calif.

[21] Appl. No.: 892,855

[22] Filed: Jun. 3, 1992

[51] Int. Cl.⁵ .............................................. F25B 9/00
[52] U.S. Cl. ...................................... 62/6; 318/561; 364/165
[58] Field of Search ...................... 62/6; 318/361, 561; 236/78; 364/165

[56] References Cited

U.S. PATENT DOCUMENTS

| | | | |
|---|---|---|---|
| 3,984,831 | 10/1976 | Jones et al. | 340/347 SY |
| 4,093,904 | 6/1978 | Burig et al. | 318/616 |
| 4,389,849 | 6/1983 | Beggs et al. | 62/6 |
| 4,397,155 | 8/1983 | Davey | 62/6 |
| 4,417,448 | 11/1983 | Horn et al. | 62/6 |
| 4,469,993 | 9/1984 | Swanson et al. | 318/561 |
| 4,486,797 | 12/1984 | Workman | 360/78 |
| 4,534,176 | 8/1985 | Horn et al. | 62/6 |
| 4,543,793 | 10/1985 | Chellis et al. | 62/6 |
| 4,567,726 | 2/1986 | Vitale et al. | 62/6 X |
| 4,594,536 | 6/1986 | Tamagaki | 318/561 |
| 4,625,156 | 11/1986 | Komiya et al. | 318/85 |
| 4,629,954 | 12/1986 | Banzai et al. | 318/561 |
| 4,634,946 | 1/1987 | Moulds, III et al. | 318/561 |
| 4,675,582 | 6/1981 | Hommes et al. | 318/338 |
| 4,733,151 | 3/1988 | Butts | 318/645 |
| 4,902,952 | 2/1990 | Lavery | 318/645 |
| 5,119,287 | 6/1992 | Nakamura et al. | 364/165 X |

OTHER PUBLICATIONS

McGraw-Hill Encyclopedia of Science and Technology; Copywright 1977; vol. 13; pp. 153–158.
The Illustrated Science and Invention Encyclopedia; Copyright 1977; pp. 2257–2259.

*Primary Examiner*—William E. Wayner
*Attorney, Agent, or Firm*—Donald C. Feix; H. Donald Volk; John J. Morrissey

[57] ABSTRACT

An adaptive control includes a digital error correction system (DECS) to reduce control system error to near zero by anticipating a problem and feeding forward in time a correction to deal with the problem before it happens. The adaptive control is used in a controlled system of the kind which is cyclical in operation and which operates in response to repetitive cycle commands so that the operation of the system is substantially predictable for a significant number of cycles of operation. The adaptive control is incorporated in a refrigerator system in which two Stirling cycle refrigerators are mounted in opposition to one another. The adaptive control permits accurate control of the command waveform frequency and shape, enables the refrigerator system to be more thermodynamically efficient, and enables the two refrigerators to exactly cancel each other's vibration.

22 Claims, 10 Drawing Sheets

FIG_7

FIG_8

ADAPTIVE ERROR CORRECTION CONTROL SYSTEM FOR OPTIMIZING STIRLING REFRIGERATOR OPERATION

BACKGROUND OF THE INVENTION

This invention relates to an adaptive error correction control system which includes a digital error correction system (DECS).

This invention relates particularly to an adaptive error correction controlled system which includes a DECS for optimizing Stirling refrigerator operation.

The adaptive control of the present invention reduces control system error to near zero by anticipating a problem and feeding forward in time a correction to deal with the problem before it happens. The adaptive control is used in a controlled system of the kind which is cyclical in operation and which operates in response to repetitive cycle commands so that the operation of the system is substantially predictable for a significant number of cycles of operation.

Conventional analog feedback controls feed an analog error signal into a control loop which is designed to reduce and/or to eliminate the error. An analog feedback control loop of this kind can be effective to reduce error to a substantial extent; but the analog feedback control loop may not function satisfactorily when it is necessary to reduce the error to near zero.

An analog system, by its nature, does not remember anything; so it does not remember the history of a cycle. An analog system is reactive, whereas an error correction system which reduces error to near zero needs to be proactive. An error correction system which can reduce error to near zero needs to know what went wrong in the past so that it can feed forward in time a correction to deal with a problem before it happens. Such an error correction system needs to know exactly what error correction is needed at each point in a cycle of operation and needs to feed forward an appropriate correction and also to apply the correction at a time interval far enough in advance of the time when the correction is needed so as to balance the system dynamics.

SUMMARY OF THE PRESENT INVENTION

The present invention provides an adaptive control which includes a digital error correcting system (DECS) effective to reduce control system error to near zero.

The adaptive control of the present invention will operate effectively in a controlled system of the kind which is cyclical in operation and which operates in response to repetitive cycle commands so that the operation of the system is substantially predictable for a significant number of cycles of operation.

The adaptive error correction control of the present invention is utilized, in one embodiment of the present invention, for optimizing Stirling refrigerator operation.

The adaptive control measures, during a cycle of operation, the error between a desired cycle command and an output signal representing actual system operation.

The adaptive control slices the measured error into a selected number of equal time based segments.

The error data in these time based segments are stored in related, separate storage areas over a number of cycles. The data accumulated in each storage area accurately represents the correction required during that time segment of the cycle.

The present invention shifts the correction data in each storage area forward in time, with respect to the time segment in the cycle at which the data was accumulated, by an amount of time represented by a selected number of the time based segments. This enables the correction to have a lead time required to balance the system dynamics.

The present invention smooths, by a local averaging process, the effect of random noise which may become stored in one or more of the separate storage areas.

The smoothed, time shifted, error correction data is converted to a form which can be combined with the desired cycle command, and the converted data is combined with the desired cycle command to produce an adapted, desired cycle command for reducing control system error to near zero.

In the Stirling refrigerator embodiment of the present invention, two Stirling refrigerators are mounted in opposition to one another. By accurate, adaptive control of the command waveform frequency and shape, the two opposed refrigerators can be made to exactly cancel each other's vibrations.

In addition, non-sinusoidal command waveforms may be generated and used to increase the thermodynamic efficiency of the Stirling refrigerators.

The adaptive control of the present invention enables the controller bandwidth (control authority) to be made large enough to accurately control refrigerator motion. The bandwidth can be large enough to detect finely resolved errors.

Adaptive control method and apparatus which incorporate the features noted above and which are effective to function as described above comprise specific objects of this invention.

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWING VIEWS

FIG. 2 shows an embodiment of the invention in which correction data is stored in digital memory.

Figure 1:
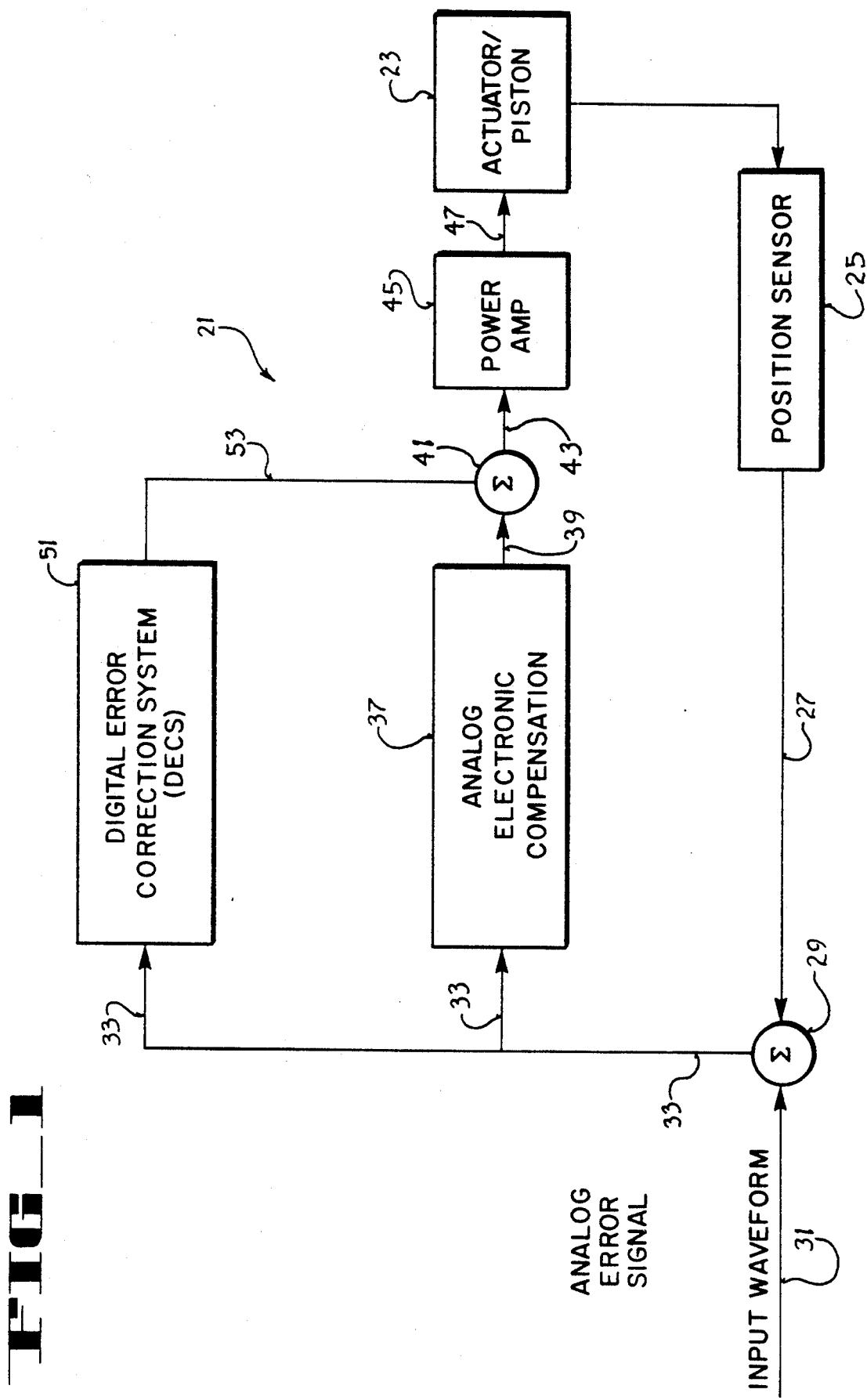
FIG. 1 is a block diagram view of an adaptive control, constructed in accordance with one embodiment of the invention, for reducing control system error to near zero.
Figure 4:
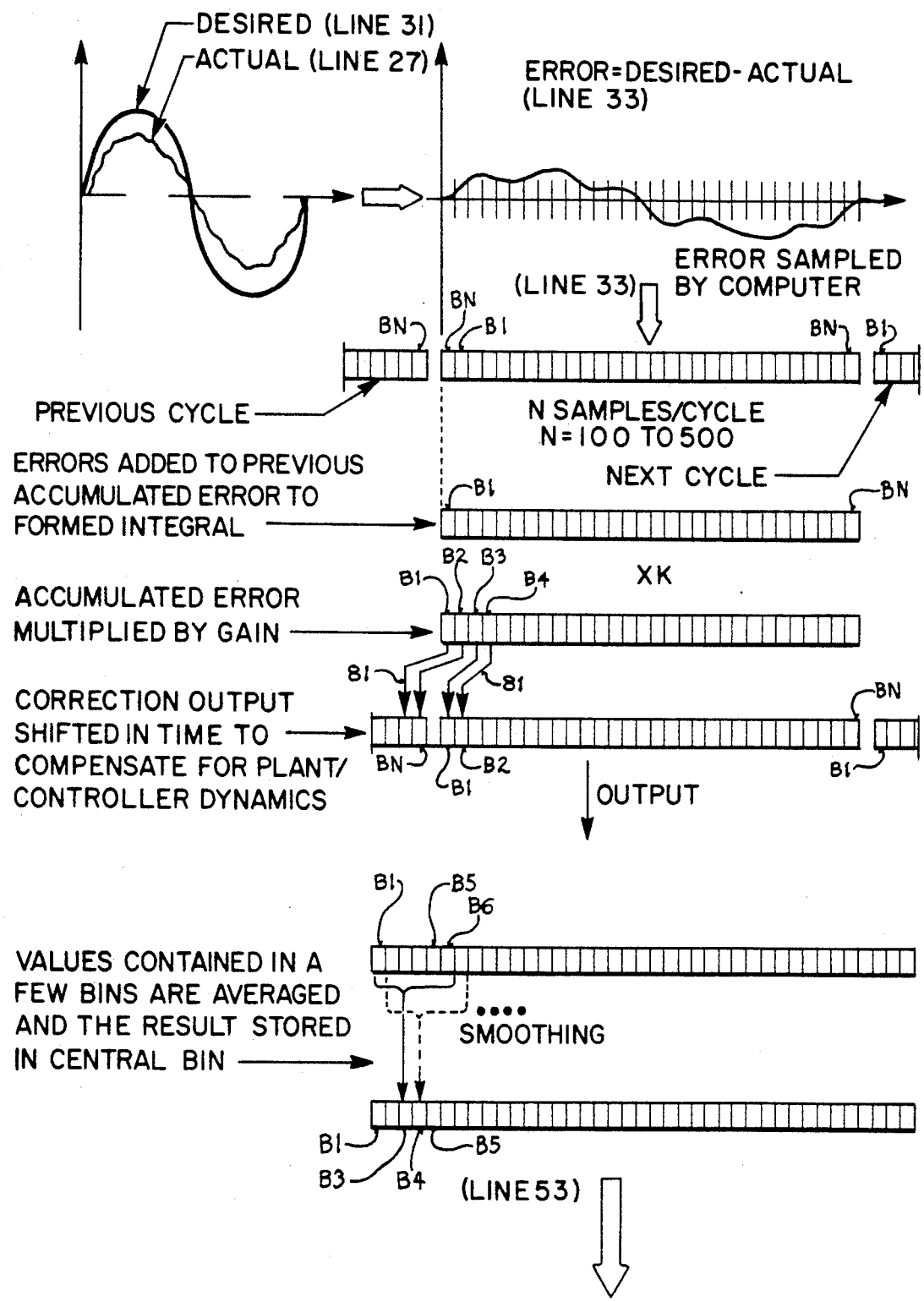

FIG. 4 is a diagrammatic view which illustrates how the adaptive control method and apparatus of the present invention operate during one cycle of operation of the system which is controlled by the adaptive control of FIG. 1. FIG. 4 illustrates the various steps involved in the adaptive control method and apparatus and also illustrates how the steps are sequenced and how the steps are operatively associated with one another.

Figure 5:
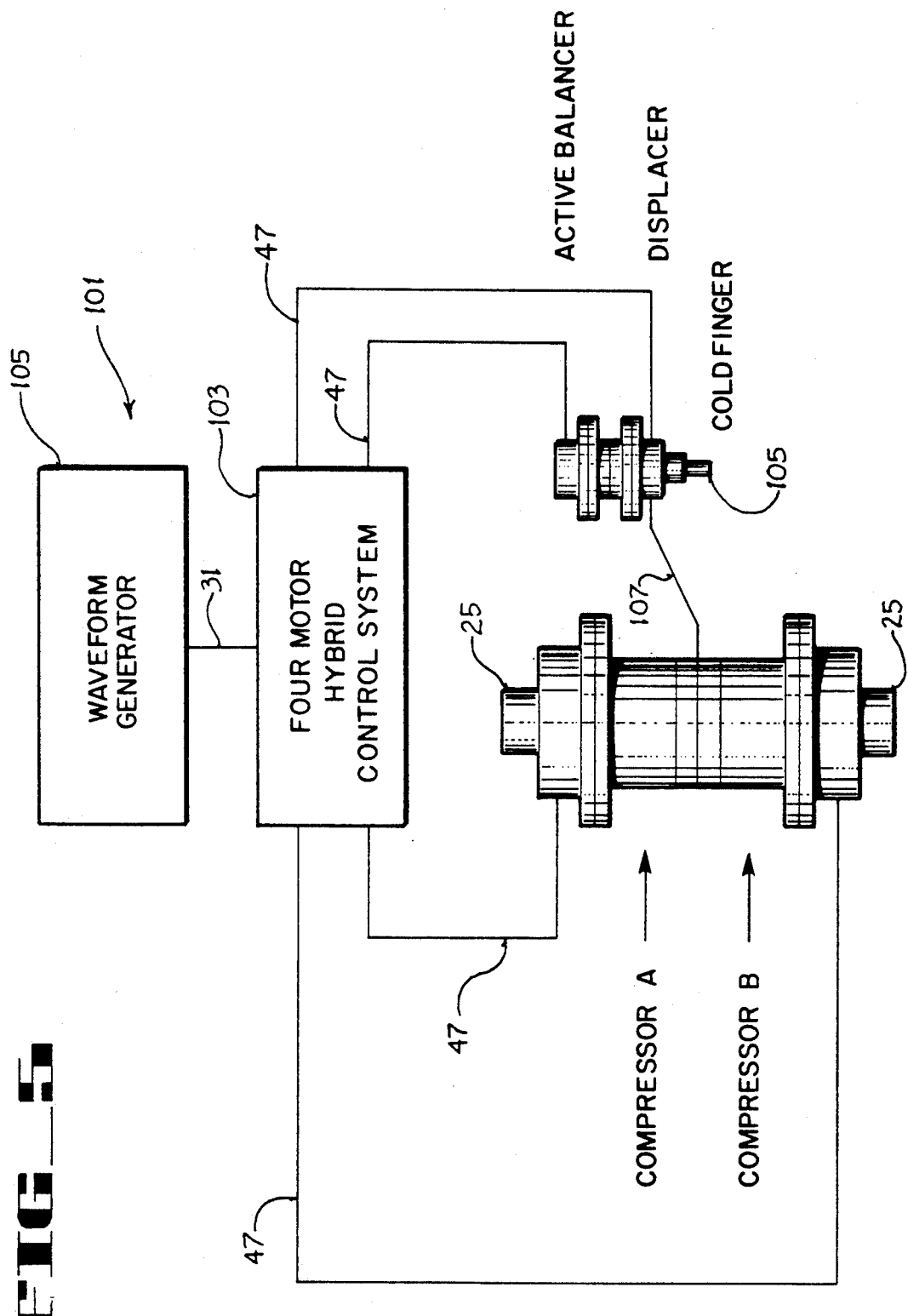

FIG. 5 is a plan view of a dual, opposed, Stirling cycle refrigerator system constructed in accordance with one embodiment of the present invention and embodying an adaptive control for reducing control system error to near zero using the control method and apparatus illustrated in FIGS. 1-4.

Figure 6:
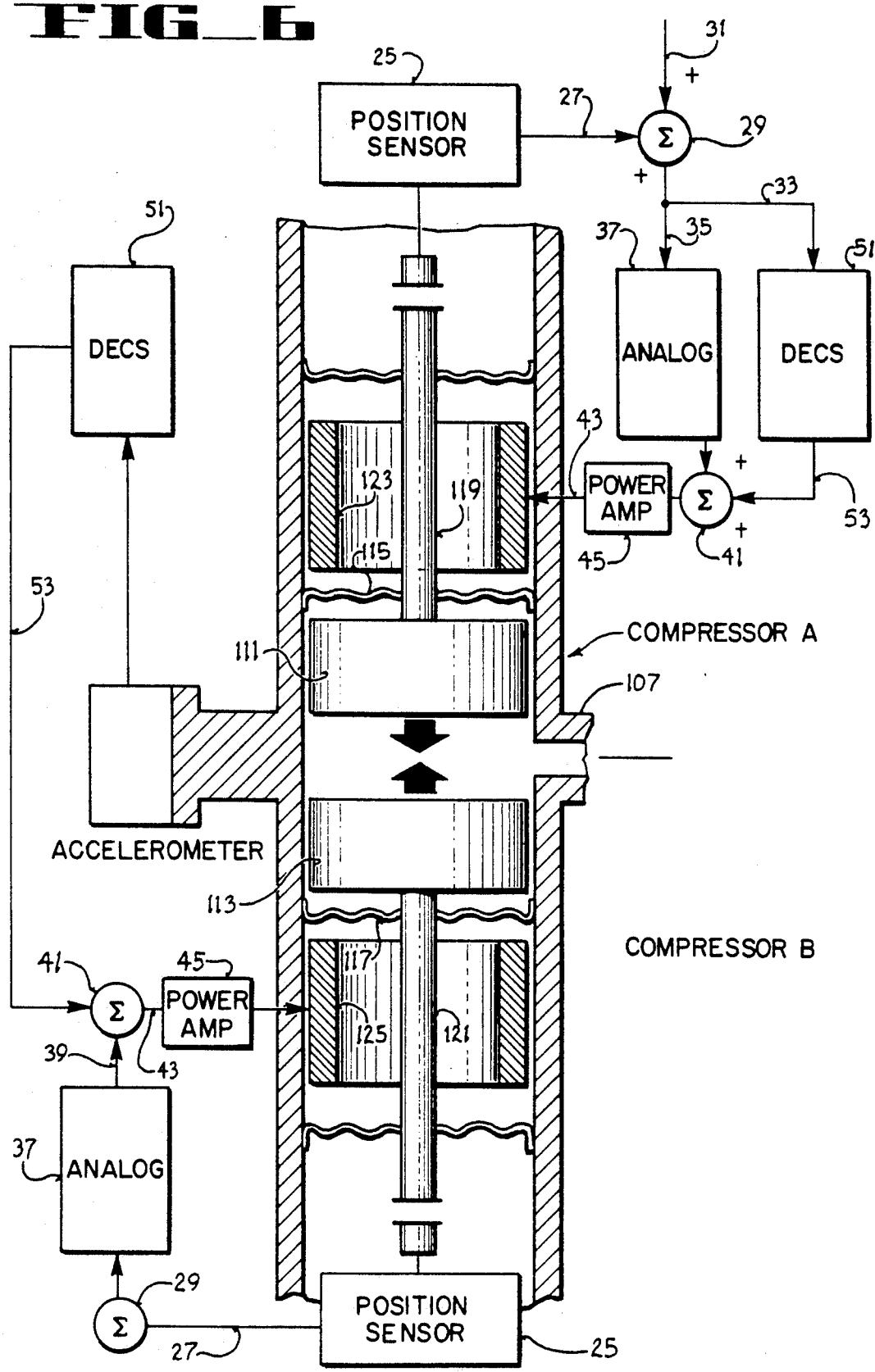

FIG. 6 is an enlarged, fragmentary view, partly in cross section, of the opposed compressors A and B of the dual Stirling cycle refrigerator system shown in FIG. 5.

Figure 7:
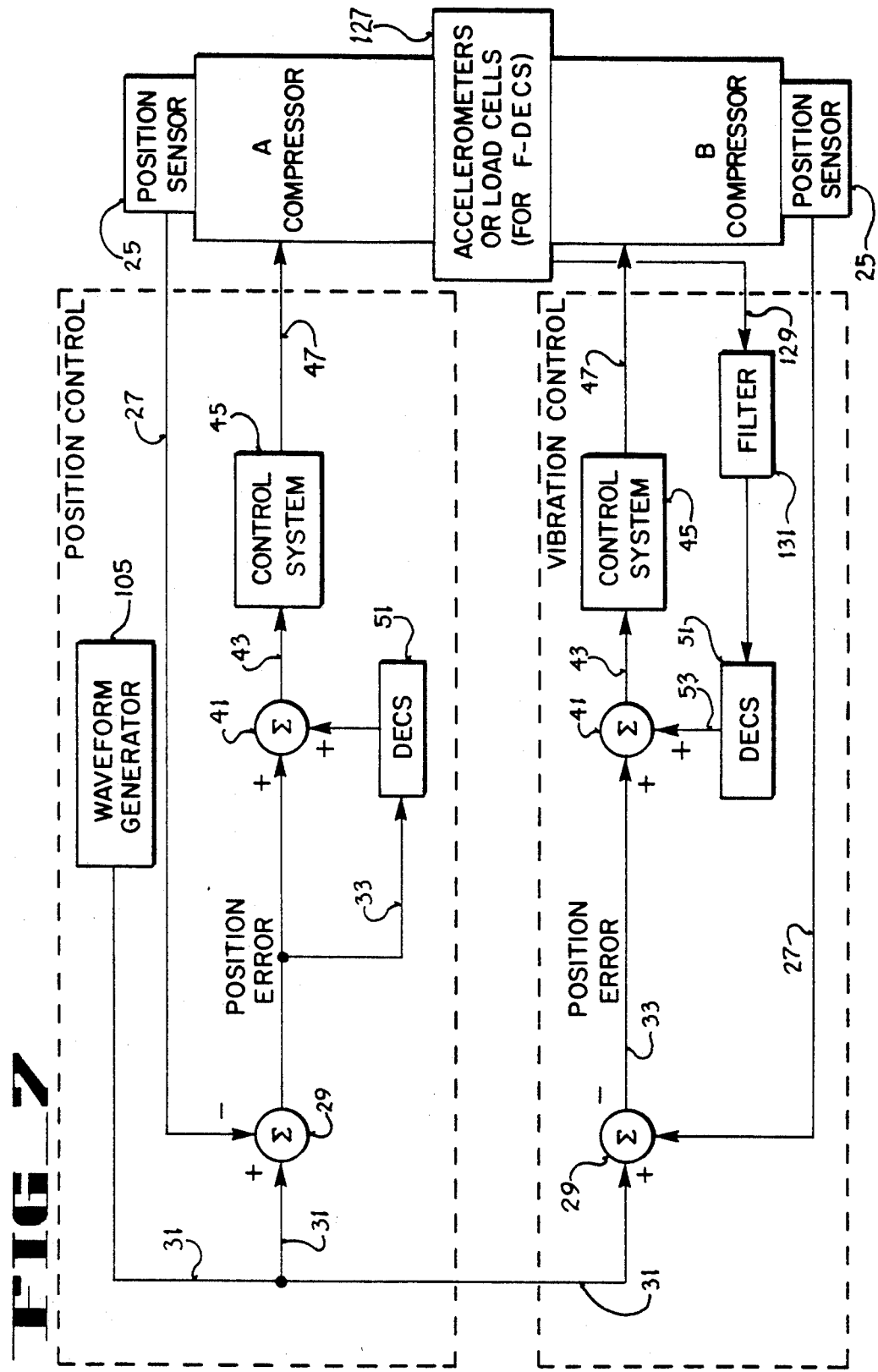

FIG. 7 is an enlarged view showing details of how control components of two adaptive controls are associated with the two compressors (A and B) for reducing control system error to near zero in the operation of each compressor. It should be noted that the digital error correcting system (DECS) portion of the adaptive control for the compressor A control could be entirely removed from the compressor A control; and the digital error correction system (DECS) control for the other compressor B would then continue to be utilized to operate the other compressor B in a counter-balance mode to counter-balance any vibration and to reduce to near zero any vibration which would otherwise be produced by operation of the compressor A.

Figure 8:
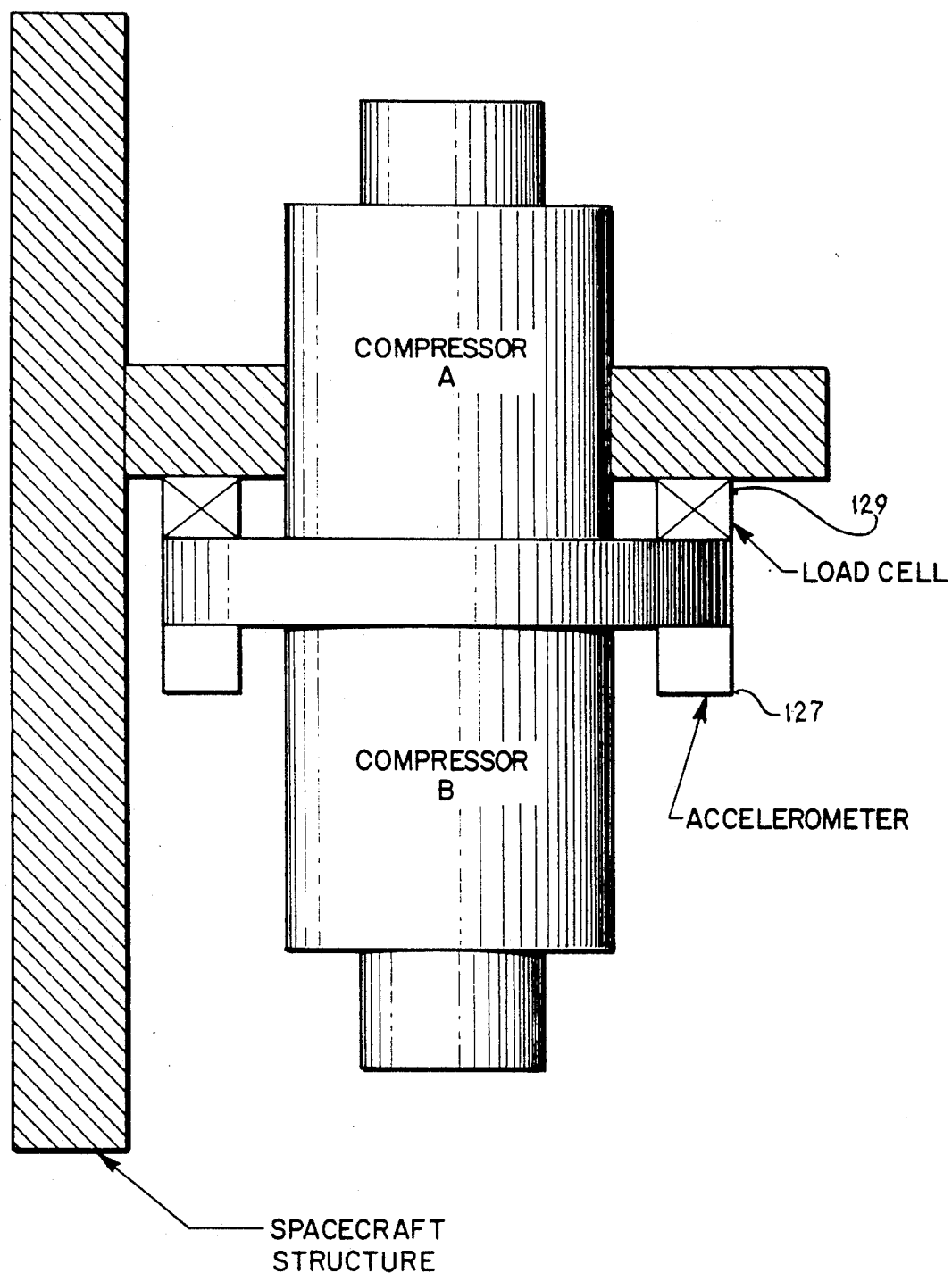

FIG. 8 is a side elevation view showing how the two compressors of FIG. 5 are mounted on space craft structure and showing also how either a load cell can be used for sensing force error or an accelerometer can be used for sensing vibration error.

Figure 9:
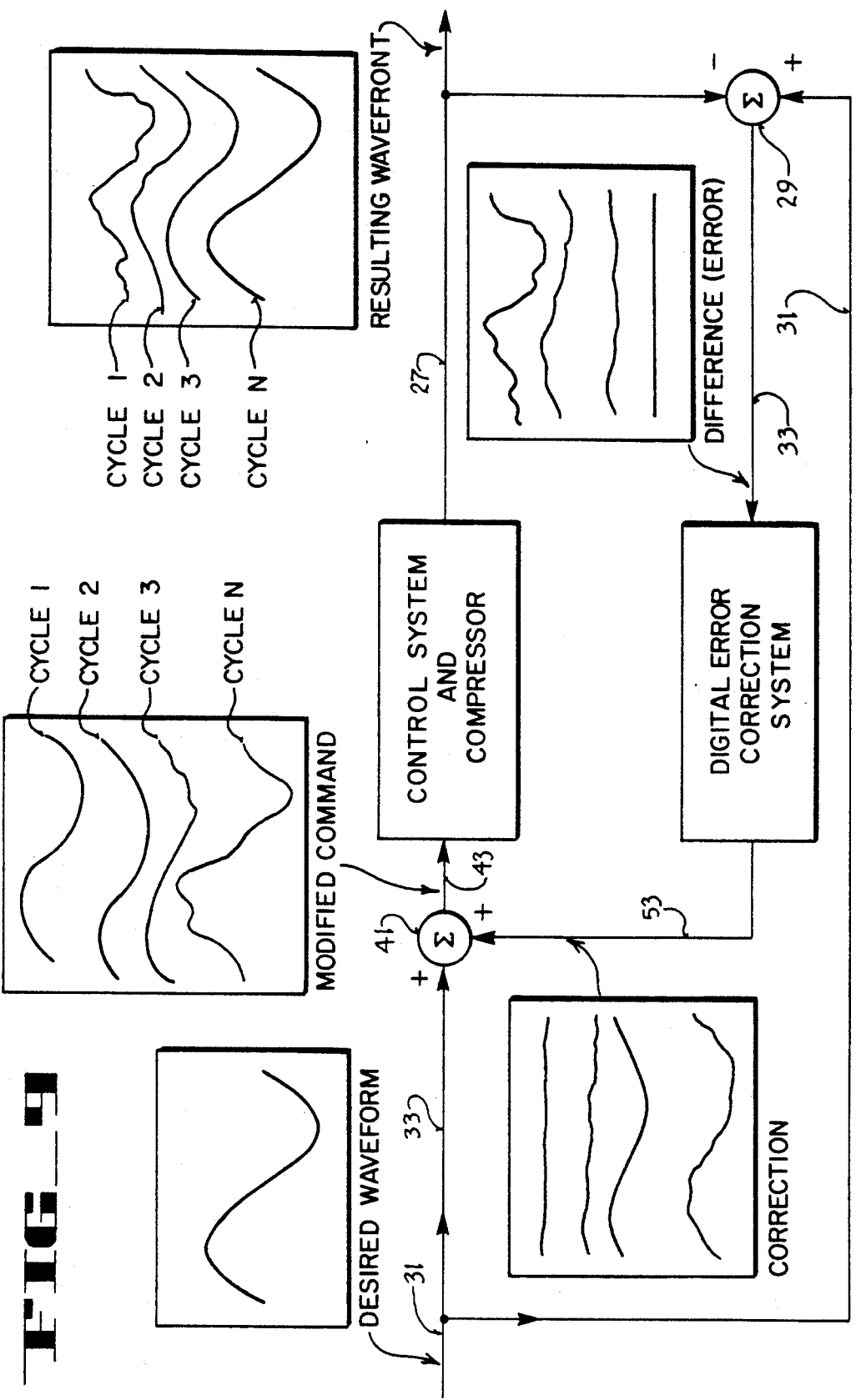

FIG. 9 is a diagrammatic view which illustrates, in top down sequence in each of the five diagram blocks, how the adaptive control reduces position error to near zero (for the compressor A system shown in FIGS. 6 and 7) over repeated cycles of operation. The five diagram blocks illustrate the action occurring at each of the five diagram block control system locations indicated in FIG. 9.

Figure 10:
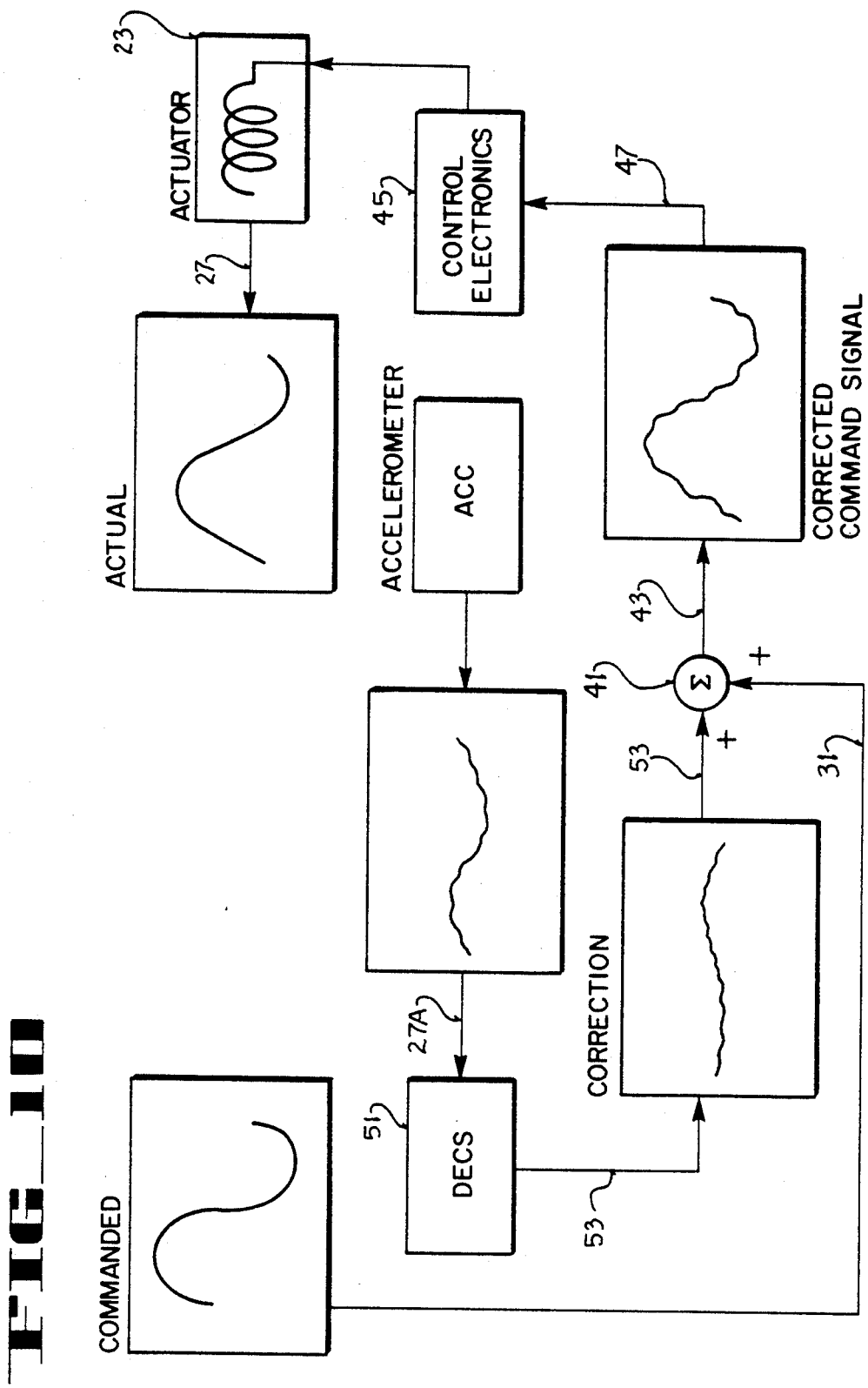

FIG. 10 is a diagrammatic view (similar to FIG. 6) illustrating how the adaptive control for compressor B (as shown in FIGS. 6 and 7) reduces vibration error to near zero.

DETAILED DESCRIPTION OF THE PREFERRED EMBODIMENTS

FIG. 1 is a block diagram view of an adaptive control, constructed in accordance with one embodiment of the present invention, for reducing control system error to near zero. The adaptive control is indicated by the general reference numeral 21. The adaptive control 21 reduces control system error to near zero by anticipating a problem and feeding forward in time a correction to deal with a problem before it happens, as will be described in more detail below with particular reference to FIG. 4.

The adaptive control 21 functions in a controlled system of the kind which is cyclical in operation and which operates in response to repetitive cycle commands so that the operation of the system is substantially predictable for a significant number of cycles of operation.

In FIG. 1 the adaptive control 21 is illustrated as associated with an actuator/piston 23.

In this particular embodiment the error which is to be sensed and which is to be reduced to near zero is a position error.

While the adaptive control 21 in FIG. 1 is used to reduce position error to near zero, it should be noted that the adaptive control of the present invention can also be utilized to reduce other types of system errors to near zero, such as, for example, a vibration error or a force error. This will become more clear in the detailed description below relating to FIGS. 6-10.

The position error of the actuator/piston 23 in the FIG. 1 embodiment is sensed by a position sensor 25 and is transmitted on a line 27 to a summing junction 29.

The desired cycle command, the input waveform, is transmitted to the summing junction by a line 31.

The difference between the desired cycle command waveform and the actual system operation waveform is output from the summing junction 29 as the analog error signal on a line 33.

This error signal on the line 33 is input into an analog electronic compensation module 37, and the output of the module 37 is transmitted, on a line 39, to a summing junction 41.

The output of the summing junction 41 is transmitted, on a line 43, to a power amplifier 45.

The output of the power amplifier, on a line 47, is transmitted to the actuator piston 23 to change the position of the actuator/piston.

The components of the adaptive control 21 as thus far described comprise components of a traditional analog feedback control for feeding an analog error signal into a control loop designed to reduce and/or to eliminate the error.

A traditional feedback control loop of this kind can be effective to reduce error to a substantial extent; but the traditional feedback control loop ma not function satisfactorily when it is necessary to reduce the error to near zero.

An analog system, by its nature, does not remember anything, so it does not know the history of operation of a cycle. An analog system is reactive whereas an error correction system which reduces error to near zero needs to be proactive. An error correction system which can reduce error to near zero needs to know what went wrong in the past so that it can feed forward in time a correction to deal with a problem before it happens. Such an error correction system needs to know exactly what error correction is needed at each point in a cycle of operation and needs to feed forward an appropriate correction and also to apply the correction at a time interval far enough in advance of the time when the correction is needed so as to balance system dynamics.

Figure 2:
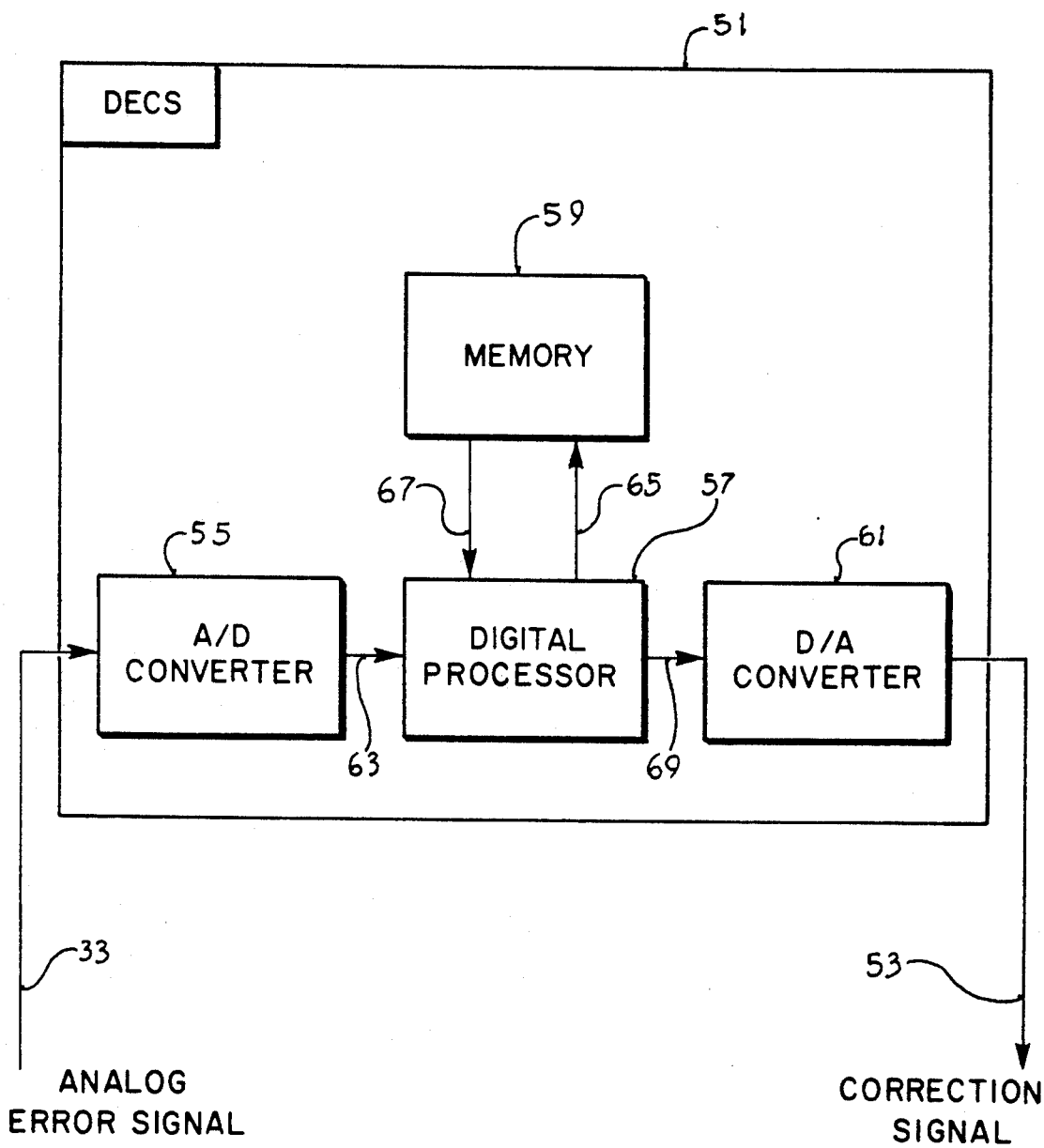
FIG. 2 is a block diagram view showing details of the digital error correction system (DECS) component of the adaptive control shown in FIG. 1.

As illustrated in FIGS. 1 and 2, the adaptive control 21 includes a digital error correcting system (DECS) module 51 which is effective to reduce control system to near zero.

As best illustrated in FIG. 2, the digital error correction system 51 comprises an analog to digital (A/D) converter 55, a digital processor 57, a memory 59, and a digital to analog (D/A) converter 61.

The A/D converter 55 receives the analog error signal from the line 33 and transmits a digital signal, on a line 63, to the digital processor 57.

The processor 57 is connected to the memory 59 by an output bus 65 and an input bus 67.

The digital processor transmits an output signal, on a line 69, to the D/A converter 61.

The correction signal from the D/A converter 61 is transmitted, on a line 53, to the summing junction 41.

The processing, within the digital error correction system module 51, of the analog error signal on the line 33 to produce the analog correction signal on the line 53 will be described in more detail below with reference to FIG. 3 and FIG. 4.

Figure 3:
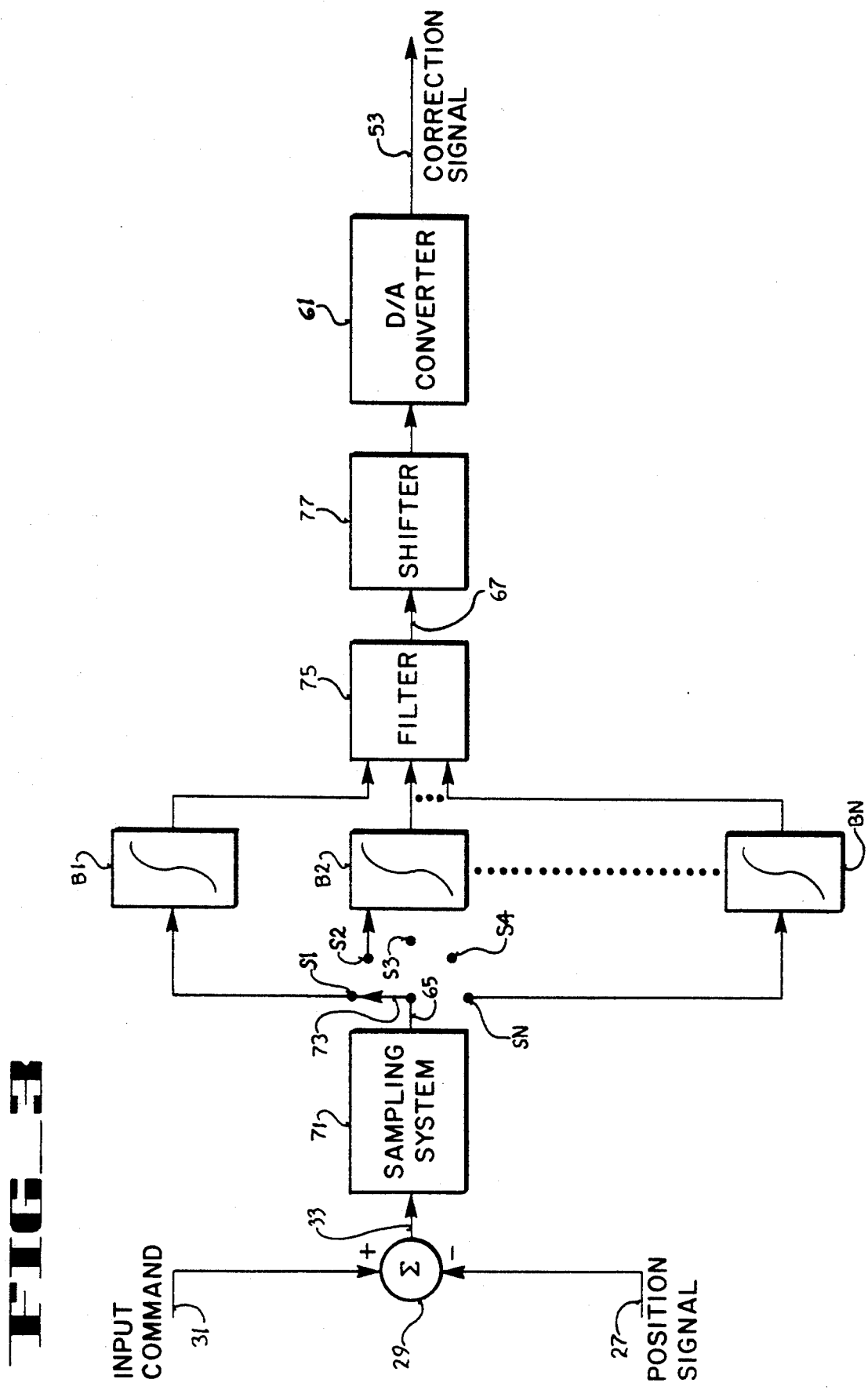
FIG. 3 is a view illustrating, in diagrammatic form, how the digital processor of FIG. 2 samples the error measured during a cycle of operation, divides the measured error into a selected number of equal time based segments, and stores each segment in a separate storage area (an address area in the memory of FIG. 2—a bin B in FIG. 4).

FIG. 3 is a view illustrating, in diagrammatic form, how the digital processor 57 of FIG. 2 samples the error measured during a cycle of operation, divides the measured error into a selected number of equal time based segments, and stores each segment in a separate storage area (an address area in the memory 59 of FIG. 2—a bin B in FIG. 4).

As illustrated in FIG. 3, the analog error signal on the output line 33 of the summing junction 29 is input into a sampling system module 71 (which can be visualized as including a rotary switch 73 stepped from switches S1 through SN during a cycle of operation) to direct equal time based segments of the error signal to separate storage areas B1, B2 . . . BN in the memory 59. The separate, digital outputs from each of these storage areas are filtered (in a filter 75), and are (by a shifter 77) shifted forward in time (as described in more detail below with reference to FIG. 4) with respect to the time segment in the cycle at which the data were accumulated.

The D/A converter 61 transmits the correction signal on the line 53 to the summing junction 41 shown in FIG. 1.

As noted above, the operation of the adaptive control method and apparatus of the present invention is graphically illustrated in FIG. 4. FIG. 4 illustrates the various steps involved in the adaptive control method and apparatus and also illustrates how the steps are sequenced and how the steps are operatively associated with one another.

As illustrated in FIG. 4, the desired cycle command, in this case a sine wave, is indicated by the "desired" legend in the upper left hand part of FIG. 4. This is the input waveform on line 31 of FIG. 1 and FIG. 3.

The output signal representing actual system operation is indicated by the legend "actual". This is the signal output from the position sensor on line 27 in FIGS. 1 and 3.

The error is the difference between the desired and the actual, and this analog error signal is the wavy line shown in the upper right hand part of FIG. 4. This is the analog error signal transmitted on line 33 in FIGS. 1, 2 and 3 of the drawings.

The error is sampled by the digital processor 57 in FIG. 2 and is divided into a selected number of samples per cycle. The measured error is thus time sliced and divided into a selected number of equal time based segments. The magnitude of the error in each segment is assigned a numerical quantity and is stored in a related, separate storage area B in the memory 59 (see memory 59 in FIG. 2 and bins B in FIG. 3 and FIG. 4).

It should be noted that, on each cycle of operation, if there is any error occurring at that particular point or time sliced segment in the cycle, then the numerical amount of that error is added to the amount previously stored in that particular storage area. This accumulation of error data in each storage area over a number of cycles accurately represents the correction required during that time segment of the cycle. This accumulation of error data is illustrated in the block entitled "CORRECTION" in FIG. 9.

The error data accumulated in each separate storage area is multiplied by a gain factor to control the rate of convergence between the adapted, desired cycle command and the output signal representing actual system operation. Multiplying by a low gain factor provides stability of operation but also produces a slow convergence. Multiplying by a higher gain factor produces a more rapid convergence; but, if the gain factor is too high, there may be problems in maintaining stability of operation.

It is an important feature of the present invention that the required correction output accumulated in each bin B (memory 59 storage area) is shifted forward in time, with respect to the time in the cycle at which the data was accumulated, by a selected amount of time, represented by a selected number of the time based segments (bins B), to enable the accumulated correction to have a lead time required to compensate for (to balance) system dynamics.

All systems have some lag between the time that a change is commanded and the time that the commanded change is actually executed. In mechanical systems there is a certain inertia which must be overcome. In electronic control systems there is a processing time and transmission time which come into play and which must be taken into consideration.

The forward shifting of the correction output is graphically illustrated by the shift arrows 81 in the lower right hand portion of FIG. 4.

Thus, the accumulated error in bin B3 is, for example, shifted forward by two time segment intervals to the bin B1 time segment of the next cycle. The accumulated error in bin B4 of one cycle is shifted forward in time to the bin B2 time segment of the next cycle, etc.

This enables the correction needed at each point in the cycle to be applied sufficiently far in advance of that time segment in the cycle so as to have the system operate in a way to eliminate the error which would otherwise occur at that point in the cycle.

The system is adaptive and is effective to reduce error to near zero; because, if the applied correction does not in fact remove the error at that exact point in the cycle, then the error occurring at that point in the cycle will continue to be measured and to be accumulated (with the previously existing correction in the appropriate bin) so that the adaptive signal on the line 43 will eventually produce an input signal to the power amplifier which will result in the actual signal on line 27 corresponding exactly to the desired input waveform on the line 31 except for cycle to cycle variations in noise.

These method and apparatus features of the present invention as thus far described with reference to FIG. 4 (and in particular the way in which the accumulated correction data functions to reduce the error to near zero) are further illustrated in diagrammatic form in FIG. 9 and will be further described in detail below with reference to FIG. 9. FIG. 9 is (as will be described in more detail below) a diagrammatic view which illustrates, in top down sequence in each of the five diagram blocks, how the adaptive control reduces control system error to near zero over repeated cycles of operation at each of the five diagram block control system locations indicated in FIG. 9.

With continued reference to FIG. 4, the present invention also includes smoothing for overcoming the effect of random noise which may become stored in one or more of the separate storage areas or bins.

Because random noise is random and is therefore not predictable, random noise can have severe consequences if adequate precautions are not taken to overcome the effects of random noise which may accumulate in one or more of the storage areas or bins.

In accordance with the present invention, the smoothing of the random noise is achieved by a local averaging process on correction data stored in a relatively small number of adjacent storage areas or bins. The local averaging process is effective to calculate an average and to put the average back into a central one of the adjacent storage areas or bins and to thereby overcome the effect of such random noise.

DECS ALGORITHM

The five operations performed by DECS that are described above are expressed mathematically by the following algorithm:

| | |
|---|---|
| $e_i = y(t_i) - u(t_i)$ | error slice |
| $z_i = z_i + e_i$ | integration |
| $s_i = s_1 - k$ | shift |
| $c_i = a\, s_{i+1} + b\, s_i + a\, s_{i-1}$ | smoothing |
| $v(t_i) = u(t_i) + c_i$ | corrected input | where u is the commanded (desired) value, y the measured value, c the correction to the command input, v is the actual input to the system (corrected input), i an integer representing the $i^{th}$ bin (e.g. $t_1$ is the $i^{th}$ time slice of a cycle and $e_1$ is the value of the error at time $t_1$ which is loaded in the $i^{th}$ bin), k the number of bin shifts, and a and b two constants defining the amount of smoothing (e.g. $a=0$, $b=1$, corresponds to no smoothing, $a=b=\frac{1}{3}$ to maximum smoothing).

As illustrated at the very bottom of FIG. 4, the values, for example, contained in bins B1 through B5 are averaged and that result is then stored in the central bin B3.

Similarly the values contained in bins B2 through B6 are averaged and the average in stored in bin B4.

The output of the digital error correction system as smoothed is then supplied (on the line 53 in FIGS. 1, 2 and 3) to an input of the summing junction 41. The summing junction 41 combines the correction signal on the line 53 with the analog error compensation signal on the line 39 to supply an adapted control signal on the line 43 to the power amplifier 45 in FIG. 1.

Over a relatively few cycles of operation, such as, for example, 10 to 20 cycles for a sine wave command waveform, the output error will be reduced to near zero so that the actual signal on line 27 will coincide with the desired signal on line 31.

While the time shift illustrated in FIG. 4 shows the correction output as shifted forward by two time segments or bins B, the actual time shift for a particular application will be dependent upon the dynamics of the systems involved.

The number of time segments or bins, B1, B2, etc. selected and used for a particular application is related to the dynamics of operation of that particular system and is also related to the processing power available for time slicing and for the accumulation of errors in the separate storage areas or bins.

In general, a larger number of time slices is preferred, because a large number of time based segments provides individual time based segments which are small enough to provide control resolution effective to remove finely resolved errors.

On the other hand, an excessive number of time slices can stress or overcome the capabilities of the processor and may not provide any actual benefits in operation over some suitable lower number of time slices. For a sine wave type command waveform, 200 time slices per cycle provides quite satisfactory results while 2,000 time slices provide little, if any, measurable improvement over 200 time slices.

With reference now to FIG. 5, a dual, opposed Stirling cycle refrigerator system, indicated by the general reference numeral 101 and constructed in accordance with one embodiment of the present invention, embodies an adaptive control for reducing control system error to near zero using the control methods and apparatus graphically illustrated in FIG. 4.

The basic principles of operation of the Stirling cycle for engines and for refrigerators are well known and are illustrated and described in numerous publications, including encyclopedic works, such as, for example, pages 153–158 of Volume 13 of the *McGraw-Hill Encyclopedia of Science and Technology*, 1977 Edition, published by McGraw-Hill, Inc. and pages 2257–2259 of *The Illustrated Science and Invention Encyclopedia*, 1977 International Edition, published by H. S. Stuttman Co., Inc. These pages of these two encyclopedic publications are incorporated by reference in this application.

In accordance with the embodiment of the invention illustrated in FIGS. 5–10, two Stirling refrigerators are associated in an opposed, counter-balancing installation and are controlled by the adaptive control apparatus and methods described above (with reference to FIGS. 1–4) to reduce control system error to near zero.

The adaptive control, in combination with the opposed refrigerator alignment, minimize vibration and can be used to maximize efficiency.

The adaptive control provides control of bandwidth (control authority) adequate to accurately control refrigerator motion.

Force cancellation can be obtained by accurate control of the opposing refrigerators.

By accurately controlling waveform frequency and shape, the two refrigerators can be made to exactly cancel each other's vibration.

In addition, non-sinusoidal waveforms may be generated and used for more thermodynamic efficiency.

The present invention applies a digital adaptive feed-forward control system to cause one or both of the refrigerators to accurately follow a commanded waveform.

Where parts in FIGS. 5–10 correspond to parts in FIGS. 1–4, corresponding reference numerals have been used.

The two refrigerator system 101 shown in FIG. 5 includes a four motor hybrid control system 103, a waveform generator 105 for the four motor hybrid control system 103, a compressor A and a compressor B (as indicated by the legends in FIG. 5), a displacer and an active balancer (as indicated by the legends FIG. 5 , a cold finger 105, and lines 47 connecting the drives for each of the compressors A and B and the displacer and active balancer with the hybrid control system 103.

The hot gas as compressed by the compressor A and compressor B is transmitted to the displacer by a conduit 107.

As best shown in the cross sectional view of FIG. 6 the compressor A includes a piston 111, and the compressor B includes a piston 113.

Helical springs 115 and 117 associated with the shafts 119 and 121 to maintain alignment of the pistons during reciprocating motion of the pistons.

FIG. 6 shows the motor 123 used to drive the piston 111 and shows the motor 125 used to drive the piston 113.

Power amplifiers 45 drive the motors.

As illustrated in FIGS. 6 and 7, the operation of compressor A can be controlled to reduce position error to near zero by means of the digital error correction system 51 operating exactly in the way described above with reference to FIGS. 1-4.

There can be some thermodynamic efficiency benefits by using a waveform which is not a pure sine wave, and the waveform generator 105 can be used to generate the exact desired waveform for the maximum thermodynamic efficiency.

The digital error correction system 51 associated with the compressor A position control (as illustrated in FIGS. 5 and 6) will then ensure that the actual operation of the compressor A (measured position of the piston during a cycle) corresponds substantially exactly to the desired waveform with near zero position error.

The operation of the compressor B can also be controlled by a DECS in response to a measured position error of the piston 113, just like the position error control for compressor A described above. By accurately controlling the position of each piston throughout a cycle of operation, vibrations of the overall assembly of the two, opposed compressors can be substantially eliminated throughout the cycle.

Vibration can, however, in accordance with a specific embodiment of the present invention, be measured and controlled directly, as will now be described.

As illustrated in FIGS. 6 and 7, the operation of the compressor B can be controlled to cause the compressor B to operate in a way to counter-balance the compressor A and to reduce vibration of the opposed compressors to near zero.

In this embodiment of the present invention, the digital error correction system 51 for the control of the B compressor receives a vibration error from an accelerometer 127 (or a force error from a load cell 129, see FIG. 8) instead of a position error. The vibration error from the accelerometer 127 is transmitted to the DECS 51 by a line 129 and is filtered by a filter 131 before being input into the DECS 51.

The vibration error in the DECS 51 is processed in the same way as a position error. That is, the vibration error is time sliced into a selected number of equal time based segments. These time based segments are stored in separate storage areas over a number of cycles to accumulate in each storage area data which accurately represents the correction required during that time segment of the cycle, the accumulated data in each storage area is shifted forward in time by an amount required to balance system dynamics, any random noise is smoothed, and the result is then converted to a form which can be combined with the desired cycle command. This converted form is then output from the DECS 51 onto the line 53 where the result is combined with the analog position error data on the line 33. The adapted signal on the line 53 will then, over a sufficient number of cycles, drive the compressor B to a mode of operation which reduces the vibration error to near zero throughout the entire cycle.

As noted above in the Brief Description of FIG. 7, the DECS 51 portion of the compressor A control could be entirely removed. The DECS 51 control for the compressor B would then continue to be utilized to operate the compressor B in a slave or counter-balance mode to reduce to near zero any vibration which would otherwise be produced by operation of the compressor A.

In general, however, it is preferable to utilize the DECS 51 position responsive control for the compressor A. It is easier to get good thermodynamic performance when position is accurately controlled.

FIG. 9 is a diagrammatic view which illustrates, in top down sequence in each of the five diagram blocks, how the adaptive control reduces position error to near zero (for the compressor A system shown in FIGS. 6 and 7) over repeated cycles of operation. The five diagram blocks illustrate the action occurring at each of the five diagram block control system locations indicated in FIG. 9.

The first, top pattern in each diagram block shows the patterns existing, at that particular diagram block location, during the first cycle (CYCLE 1) of operation. The second pattern from the top shows the pattern existing, at that particular diagram block location, during the second cycle (CYCLE 2) of operation, and so on. The lowermost pattern is produced after a number of cycles (CYCLES N) of operation.

FIG. 10 is a diagrammatic view (similar to FIG. 9) illustrating how the adaptive control for the compressor B (as shown in FIGS. 6 and 7) reduces vibration error to near zero (in steady state after adaptation had occurred).

The correction shown in the diagram block at the lower left hand corner of FIG. 9 illustrates the correction data existing in the bins B (in the separate memory locations). As illustrated in the top down development, the correction accumulates until the numerical value of the correction in each bin is large enough to provide the proper adaptation to the modified command on line 43.

The control system 103 shown in FIG. 5 provides adaptive controls for the displacer and active balancer to reduce control system error to near zero for these units in the same way as described above for the compressors A and B.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. An adaptive control for reducing control system error to near zero, by anticipating a problem and feeding forward in time a correction to deal with a problem before it happens, in a controlled system of the kind which is cyclical in operation and which operates in response to repetitive cycle commands so that the operation of the system is substantially predictable for a significant number of cycles of operation, said adaptive control comprising, error measuring means for measuring during a cycle of operation the error between a desired cycle command and an output signal representing actual system operation, time slicing means for dividing the error measured during a cycle into a selected number of equal time based segments, storage means for storing corresponding time based segments in related, separate storage areas over a number of cycles to accumulate in each storage area data accurately representing the correction required during that time segment of the cycle, shifting means for shifting the accumulated data in each storage area forward in time, with respect to the time segment in the cycle at which the data was accumulated, by an amount of time represented by a selected number of the time based segments, to enable the required correction to have a lead time required to balance system dynamics, smoothing means for overcoming the effect of random noise which may become stored in one or more of said separate storage areas, converting means for converting the accumulated, time shifted data to a form which can be combined with the desired cycle command, and combining means for combining the converted data with the desired cycle command to produce an adapted, desired cycle command for reducing control system error to near zero.

2. The invention defined in claim 1 wherein the storage means are effective to add new data on each cycle to old data obtained from prior cycles and to store and to accumulate the result obtained by said adding of the new data to the old data.

3. The invention defined in claim 1 wherein the shifting means compensate for the delays introduced by the dynamics of the controlled system.

4. The invention defined in claim 1 including gain means for multiplying the stored data by a gain factor to control the rate of convergence between the adapted, desired cycle command and the output signal representing actual system operation.

5. The invention defined in claim 1 wherein the converting means include a digital to analog converter for converting digital data to an analog form.

6. The invention defined in claim 1 wherein the combining means include a summing junction for summing analog inputs.

7. The invention defined in claim 1 wherein the smoothing means are effective to produce a local averaging process on data stored in a relatively small number of adjacent storage areas and are effective to calculate an average and to put the average back into a central one of said adjacent storage areas.

8. The invention defined in claim 1 wherein the selected number of equal time based segments is a number high enough to provide control resolution effective to remove finely resolved errors measured by the error measuring means.

9. The invention defined in claim 8 wherein the selected number of equal time based segments is within the range of 150 to 200 for a sine wave type cycle.

10. The invention defined in claim 1 wherein the error measured is a position error.

11. The invention defined in claim 1 wherein the error measured is a vibration error.

12. The invention defined in claim 1 wherein the error measured is a force error.

13. The invention defined in claim 1 wherein the error measured is a physical variable associated with the system and which can be sensed directly or indirectly and used as an input to the adaptive control so as to make the sensed physical variable conform to a desired cyclical pattern including a constant value, such as near zero.

14. The invention defined in claim 1 wherein the control system is a Stirling cycle refrigerator system and the error measuring means measure the error between a desired position of a component of the refrigerator system and an output signal representing the actual position of the component during a cycle of operation.

15. The invention defined in claim 1 wherein the control system comprises a dual Stirling cycle refrigerator system comprising two Stirling cycle refrigerators and wherein a first Stirling cycle refrigerator is operated in response to a desired cycle command mode and a second Stirling cycle refrigerator is operated in a counter-balance command mode to counter-balance any vibration resulting from operation of the first Stirling cycle refrigerator and wherein the error measuring means measure vibration produced by the dual operation for reducing the vibration to near zero.

16. A Stirling cycle refrigerator system comprising,
a compressor,
a displacer,
a cold finger assembly,
electromagnetic drive means for driving the compressor to supply compressed fluid to the displacer for producing cooling in the cold finger assembly,
desired signal input means for generating a desired cycle command for operation of the compressor,
output sensing means for sensing an output parameter of operation of the compressor which output parameter is continuously controlled during all system operation including operation during dynamic disturbances and changes in the fundamental system characteristics, such as disturbances and changes in the temperature of the compressed fluid, the power supplied to the electromagnetic drive means, wear and tear in the system, and electrical noise,
continuously adaptive control means connected to the desired signal input means, the electromagnetic drive means and the output sensing means for accumulating, over a number of cycles of operation, error correction data relating to the sensed parameter and for combining the accumulated error correction data with the desired command for reducing error to near zero in the sensed parameter after a relatively few cycles of operation and for thereafter continuously combining accumulated error correction data reflecting subsequent changes in the sensed output parameter resulting from dynamic disturbances and changes in the fundamental system characteristics to maintain the error near zero during continued cycles of operation.

17. A Stirling cycle refrigerator comprising,
a compressor,
a displacer,
a cold finger assembly,
electromagnetic drive means for driving the compressor to supply compressed fluid to the displacer for producing cooling in the cold finger assembly,
desired signal input means for generating a desired cycle command for operation of the compressor,
output sensing means for sensing an output parameter of operation of the compressor,
adaptive control means connected to the desired signal input means, the electromagnetic drive means and the output sensing means for accumulating, over a number of cycles of operation, error correction data relating to the sensed parameter and for combining the accumulated error correction data with the desired command for reducing error to near zero in the sensed parameter after a relatively few cycles of operation and for thereafter maintaining the error near zero during continued cycles of operation, and wherein the adaptive control means comprise, error measuring means for measuring during a cycle of operation the error between the desired cycle command and the output parameter of the sensing means representing actual system operation, time slicing means for dividing the error measured during a cycle into a selected number of equal time based segments, storage means for storing corresponding time based segments in related, separate storage areas over a number of cycles to accumulate in each storage area data accurately representing the correction required during that time segment of the cycle, shifting means for shifting the accumulated data in each storage area forward in time, with respect to the time segment in the cycle at which the data was accumulated, by an amount of time represented by a selected number of the time based segments, to enable the required correction to have a lead time required to balance system dynamics, smoothing means for overcoming the effect of random noise which may become stored in one or more of said separate storage areas, converting means for converting the accumulated, time shifted data to a form which can be combined with the desired cycle command, and combining means for combining the converted data with the desired cycle command to produce an adapted, desired cycle command for reducing control system error to near zero.

18. A dual, opposed, Stirling cycle refrigerator constructed and controlled to reduce vibration to near zero throughout a cycle of operation, said refrigerator comprising, two opposed compressors, two opposed displacers, a cold finger assembly, separate electromagnetic drive means for driving each of the compressors and displacers to produce cooling in the cold finger assembly, desired waveform generator means for generating four, separate, desired cycle commands, for operation of each of the respective four separate electromagnetic drive means, during a cycle of operation of the refrigerator, output sensing means for sensing an output parameter of operation of at least one of the compressors, adaptive control means connected to the desired cycle command of at least one of the compressors and to the electromagnetic drive means for at least one of the compressors and to the output sensing means of at least one of the compressors for accumulating, over a number of cycles of operation, error correction data relating to the sensed parameter and for combining the accumulated error correction data with the desired command for reducing error to near zero in the sensed parameter after a relatively few cycles of operation and for thereafter maintaining the error near zero during continued cycles of operation, and wherein the reduction of the error to near zero in the sensed parameter of operation of at least one of the compressors is, in combination with the opposed positioning of the two compressors, effective to reduce vibration to near zero throughout a cycle of operation of the refrigerator.

19. The invention defined in claim 18 wherein the sensed parameter is the combined vibration of the two opposed compressors.

20. The invention defined in claim 18 wherein the output sensing means include first output sensing means for sensing the position of the piston of one of the compressors and wherein the output sensing means include second output sensing means for sensing the combined vibration of the two opposed compressors and wherein the adaptive control means are connected to the desired cycle command of the second of the compressors and to the electromagnetic drive means of the second of the compressors and to the vibration output sensing means of the second of the compressors.

21. The invention defined in claim 18 wherein the adaptive control means comprise, error measuring means for measuring during a cycle of operation the error between the desired cycle command and the output parameter of the sensing means representing actual system operation, time slicing means for dividing the error measured during a cycle into a selected number of equal time based segments, storage means for storing corresponding time based segments in related, separate storage areas over a number of cycles to accumulate in each storage are data accurately representing the correction required during that time segment of the cycle, shifting means for shifting the accumulated data in each storage area forward in time, with respect to the time segment in the cycle at which the data was accumulated, by an amount of time represented by a selected number of the time based segments, to enable the required correction to have a lead time required to balance system dynamics, smoothing means for overcoming the effect of random noise which may become stored in one or more of said separate storage areas, converting means for converting the accumulated, time shifted data to a form which can be combined with the desired cycle command, and combining means for combining the converted data with the desired cycle command to produce an adapted, desired cycle command for reducing control system error to near zero.

22. A method for reducing control system error to near zero, by anticipating a problem and feeding forward in time a correction to deal with a problem before it happens, in a controlled system of the kind which is cyclical in operation and which operates in response to repetitive cycle commands so that the operation of the system is substantially predictable for a significant number of cycles of operation, said method comprising, measuring during a cycle of operation the error between a desired cycle command and an output signal representing actual system operation, slicing the error measured during a cycle to divide the error into a selected number of equal time based segments, storing corresponding time based segments in related, separate storage areas over a number of cycles to accumulate in each storage area data accurately representing the correction required during that time segment of the cycle, shifting the accumulated data in each storage area forward in time, with respect to the time segment in the cycle at which the data was accumulated, by an amount of time represented by a selected number of the time based segments, to enable the required correction to have a lead time required to balance system dynamics, smoothing the effect of random noise which may become stored in one or more of said separate storage areas, converting the accumulated, time shifted data to a form which can be combined with the desired cycle command. and combining the converted data with the desired cycle command to produce an adapted, desired cycle command for reducing control system error to near zero.

* * * * *